(12) United States Patent
Hao et al.

(10) Patent No.: US 8,376,295 B2
(45) Date of Patent: Feb. 19, 2013

(54) DUAL-LAYER SUCTION CUP

(76) Inventors: Yang Hao, Zhongli (TW); Ming Da Huang, Guangdong (CN)

( * ) Notice: Subject to any disclaimer, the term of this patent is extended or adjusted under 35 U.S.C. 154(b) by 33 days.

(21) Appl. No.: 12/985,662

(22) Filed: Jan. 6, 2011

(65) Prior Publication Data

US 2012/0175484 A1    Jul. 12, 2012

(51) Int. Cl.
*A45D 42/14* (2006.01)
*F16B 47/00* (2006.01)

(52) U.S. Cl. .................................. 248/206.2; 248/205.5

(58) Field of Classification Search .............. 248/205.6, 248/205.7, 205.9, 206.1, 206.2, 205.5, 205.8, 248/206.3, 362, 363, 206.4, 309.3, 683, 688
See application file for complete search history.

(56) References Cited

U.S. PATENT DOCUMENTS

| | | | | | |
|---|---|---|---|---|---|
| 4,858,976 | A | * | 8/1989 | Stoll | 294/186 |
| 5,395,159 | A | * | 3/1995 | Pinto | 297/395 |
| 6,053,464 | A | * | 4/2000 | Cardarelli | 248/205.8 |
| 7,066,434 | B2 | * | 6/2006 | Kwok | 248/205.8 |
| 7,850,133 | B2 | * | 12/2010 | Carnevali | 248/205.5 |
| 7,913,963 | B2 | * | 3/2011 | Cheng et al. | 248/205.5 |
| 2011/0220767 | A1 | * | 9/2011 | Stewart et al. | 248/121 |

* cited by examiner

*Primary Examiner* — Nkeisha Smith
(74) *Attorney, Agent, or Firm* — Chun-Ming Shih

(57) ABSTRACT

A dual-layer suction cup includes an outer body, an adhesive soft inner body and an elastic unit. The outer body is made of a hard material. The adhesive soft inner body can be attached to a smooth airtight surface and a rough airtight surface, providing an adhesion effect. The elastic unit will provide elasticity in an opposite direction after being pressed, such that the chamber in the suction cup is in a vacuum state to enhance the adhesion effect. The adhesive soft inner body and the elastic unit of the present invention greatly enhance the adhesion effect.

9 Claims, 7 Drawing Sheets

DUAL-LAYER SUCTION CUP

BACKGROUND OF THE INVENTION

1. Field of the Invention

The present invention relates to a suction cup, and more particularly, to a dual-layer suction cup capable of adhering to a smooth airtight surface or a rough airtight surface in a press type.

2. Description of the Prior Art

A suction cup is widely used because there is no need for nails and adhesion. Besides, the suction cup won't damage the wall surface and the position of the suction cup can be changed at any time. Most vacuum suction cups on the market only can adhere to a smooth and airtight surface, such as a glass surface or a tile surface.

A conventional suction cup comprises a rubber soft pad disposed in an outer suction body. The bottom of the soft pad has a chamber. The soft pad is pressed to adhere to a working surface through the outer suction body by exhausting the air in the chamber. By the pressure difference inside and outside, the rubber soft pad can adhere to a smooth airtight surface. If the working surface is a rough airtight surface, the rubber soft pad cannot seal the rough airtight surface, which results in that this kind of suction cup cannot be used.

An improved suction cup is provided with an air-extracting structure to enhance its adhesion effect. But, it cannot attach to a rough airtight surface, either. This suction cup is complicated and has a high cost, so it cannot be used widely. Accordingly, the inventor of the present invention has devoted himself based on his many years of practical experiences to solve this problem.

SUMMARY OF THE INVENTION

The primary object of the present invention is to provide a dual-layer suction cup, which can adhere to a rough airtight surface. Particularly, the suction cup is provided with an elastic unit. The elastic unit will provide elasticity in an opposite direction after being pressed, such that the chamber in the suction cup is in a vacuum state to enhance the adhesion effect.

A further object of the present invention is to provide a dual-layer suction cup, which is simple in structure and is cost-effective and can be used easily.

In order to achieve the aforesaid objects, there is provided a dual-layer suction cup which comprises an outer body, an adhesive soft inner body and an elastic unit.

Preferably, the outer body is made of a hard material which has a hardness ranged from 65 to 75 degrees Shore.

Preferably, the outer body is made of either Thermoplastic Elastomer (TPE) or Thermoplastic Rubber (TPR).

Preferably, the outer body has a dish-like shape and a protruding central portion. The outer body includes a connection mouth on a top end thereof, a partition under the connection mouth, a first chamber under the partition inside the outer body, a second chamber under the first chamber, an annular flange, and an annular rib on top of an outer edge of the outer body. The second chamber is larger than the first chamber.

Preferably, the outer body further has an annular groove on the side of the first chamber.

Preferably, the adhesive soft inner body is adhered to the second chamber of the outer body, corresponding in shape to the second chamber.

Preferably, the adhesive soft inner body has an opening at a central portion thereof. The opening corresponds in size to the first chamber.

Preferably, the adhesive soft inner body is made of a soft material which has a hardness ranged from 0 to 10 degrees Shore Preferably, the adhesive soft inner body is made of either Thermoplastic Elastomer (TPE) or Thermoplastic Rubber (TPR).

Preferably, the adhesive soft inner body can be attached to a smooth airtight surface and a rough airtight surface. The adhesive soft inner body can be deformed to seal the rough airtight surface fully, providing a better adhesion effect.

Preferably, the elastic unit is disposed in the first chamber. The elastic unit comprises a base, a slide seat, an elastic member and a top lid.

Preferably, the base is hollow inside. The base has an outlet at the center of a lower end thereof, a narrowed stop ring at the outlet, and an engaging ring on an outer wall of the base.

Preferably, the slide seat is accommodated in the base and is movable inward or outward. The slide seat has an open upper end, an accommodation room, a closed lower end, a closed side wall and an extension flange on the upper end of the slide seat. The extension flange is blocked by the stop ring of the base.

Preferably, the elastic member is received in the accommodation room of the slide seat. The elastic member is a spring.

Preferably, the top lid is disposed on top of the base. The top lid has a positioning ring at the bottom of the top lid and a space formed in the positioning ring to accommodate the elastic member.

Preferably, the engaging ring of the base is located in the annular groove of the outer body, such that the base is connected to the outer body.

DETAILED DESCRIPTION OF THE PREFERRED EMBODIMENTS

Embodiments of the present invention will now be described, by way of example only, with reference to the accompanying drawings.

Figure 1:
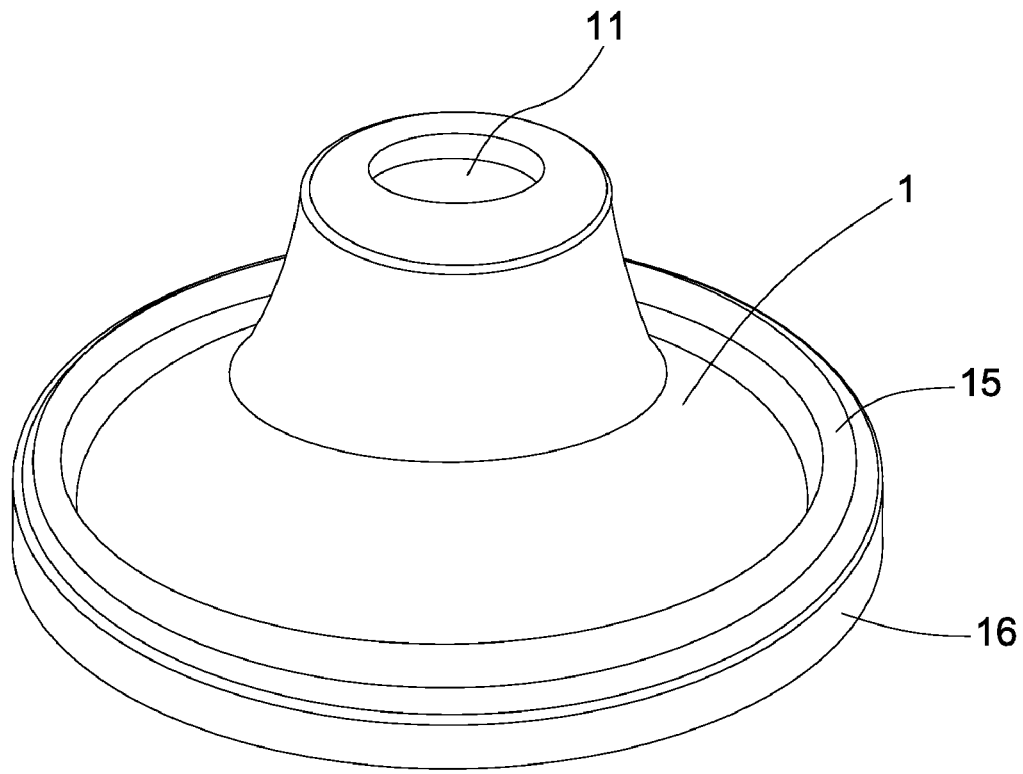
FIG. 1 is a perspective view of the present invention.
Figure 2:
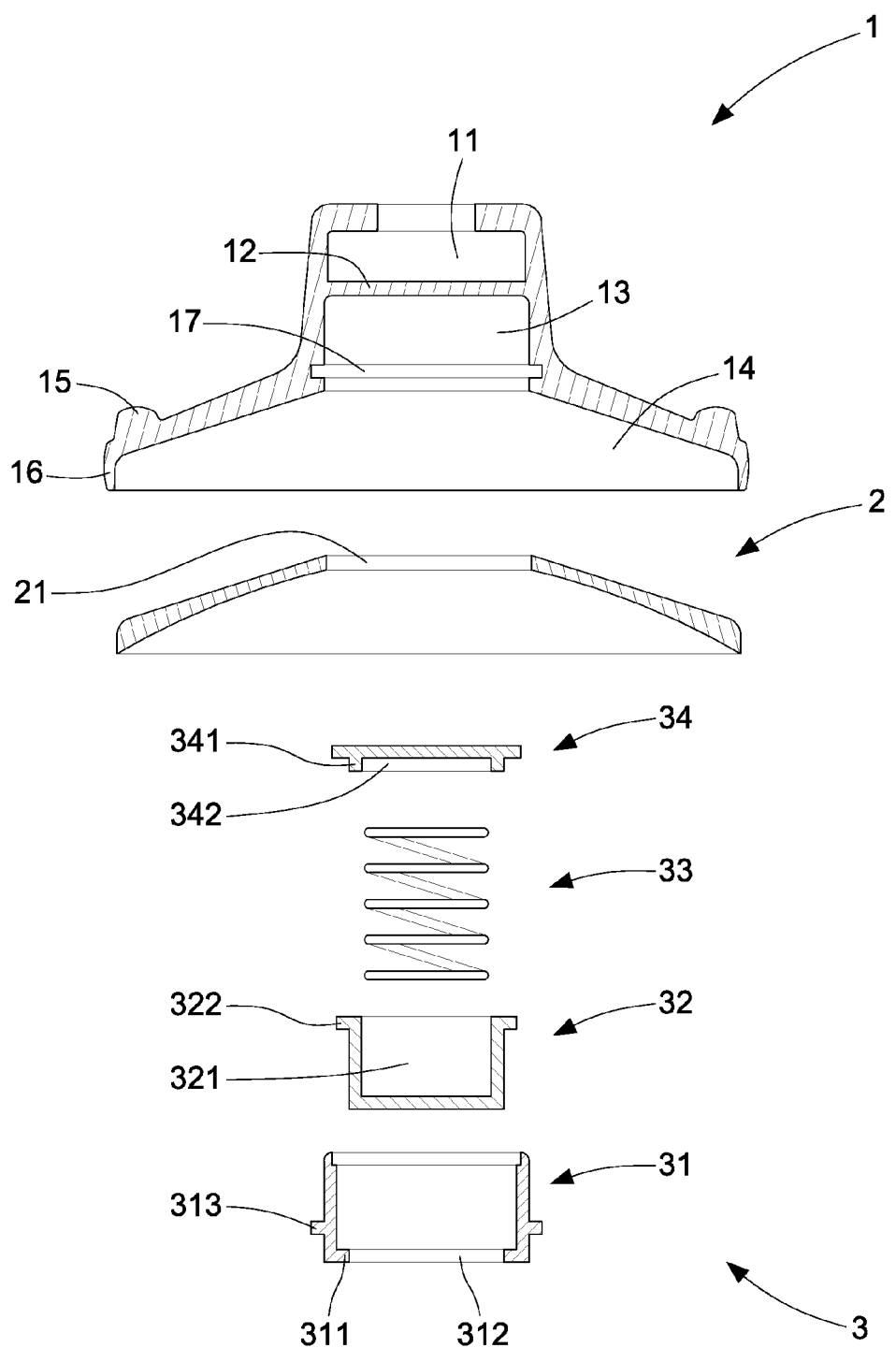
FIG. 2 is an exploded cross-sectional view of the present invention.
Figure 3:
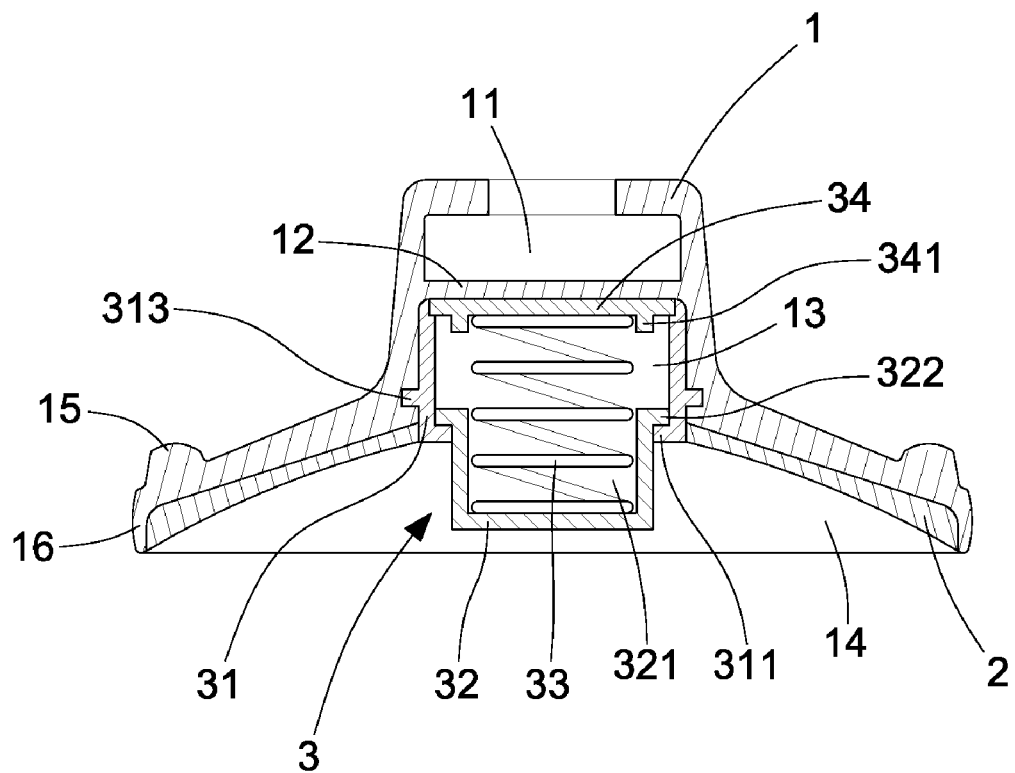
FIG. 3 is an assembled cross-sectional view of the present invention.

As shown in FIG. 1 through FIG. 3, a dual-layer suction cup according to a preferred embodiment of the present invention comprises an outer body 1, an adhesive soft inner body 2, and an elastic unit 3.

The outer body 1 is made of a hard material which has a hardness ranged from 65 to 75 degrees Shore and is made of either Thermoplastic Elastomer (TPE) or Thermoplastic Rubber (TPR). The outer body 1 has a dish-like shape and a protruding central portion. The outer body 1 includes a connection mouth 11 on a top end thereof, a partition 12 under the connection mouth 11, a first chamber 13 under the partition 12 inside the outer body 1, a second chamber 14 under the first chamber 13, an annular flange 16, and an annular rib 15 on top of an outer edge of the outer body 1. The second chamber 14 is larger than the first chamber 13. The outer body 1 further has an annular groove 17 on the side of the first chamber 13.

The adhesive soft inner body 2 is adhered to the second chamber 14 of the outer body 1, corresponding in shape to the second chamber 14. The adhesive soft inner body 2 has an opening 21 at a central portion thereof. The opening 21 corresponds in size to the first chamber 13. The adhesive soft inner body 2 is made of a soft material which has a hardness ranged from 0 to 10 degrees Shore and is made of either Thermoplastic Elastomer (TPE) or Thermoplastic Rubber (TPR).

The elastic unit 3 is disposed in the first chamber 31. The elastic unit 3 comprises a base 31, a slide seat 32, an elastic member 33, and a top lid 34. The base 31 is hollow inside. The base 31 has an outlet 312 at the center of a lower end thereof, a narrowed stop ring 311 at the outlet 312, and an engaging ring 313 on an outer wall of the base 31. The engaging ring 313 is located in the annular groove 17 of the outer body 1, such that the base 31 is connected to the outer body 1. The slide seat 32 is accommodated in the base 31 and is movable inward or outward. The slide seat 32 has an open upper end, an accommodation room 321, a closed lower end, a closed side wall and an extension flange 322 on the upper end of the slide seat 32. The extension flange 322 is blocked by the stop ring 311 of the base 31. The elastic member 33 is received in the accommodation room 321 of the slide seat 32. The elastic member 33 is a spring. The top lid 34 is disposed on top of the base 31. The top lid 34 has a positioning ring 341 at the bottom of the top lid 34 and a space 342 formed in the positioning ring 341 to accommodate an upper end of the elastic member 33.

The adhesive soft inner body 2 is adhered to the second chamber 14 of the outer body 1, and the engaging ring 313 of the elastic unit 3 is engaged with the annular groove 17 of the outer body 1, such that the base 31 of the elastic unit 3 is connected to the outer body 1. The slide seat 32 is movable in the outlet 312 with respect to the top lid 34. Normally, by the elasticity of the elastic member 33, the slide seat 32 is located at the outer end of the outlet 312 of the base 31, namely, the extension ring 322 is against the stop ring 311 as shown in FIG. 3.

Figure 4:
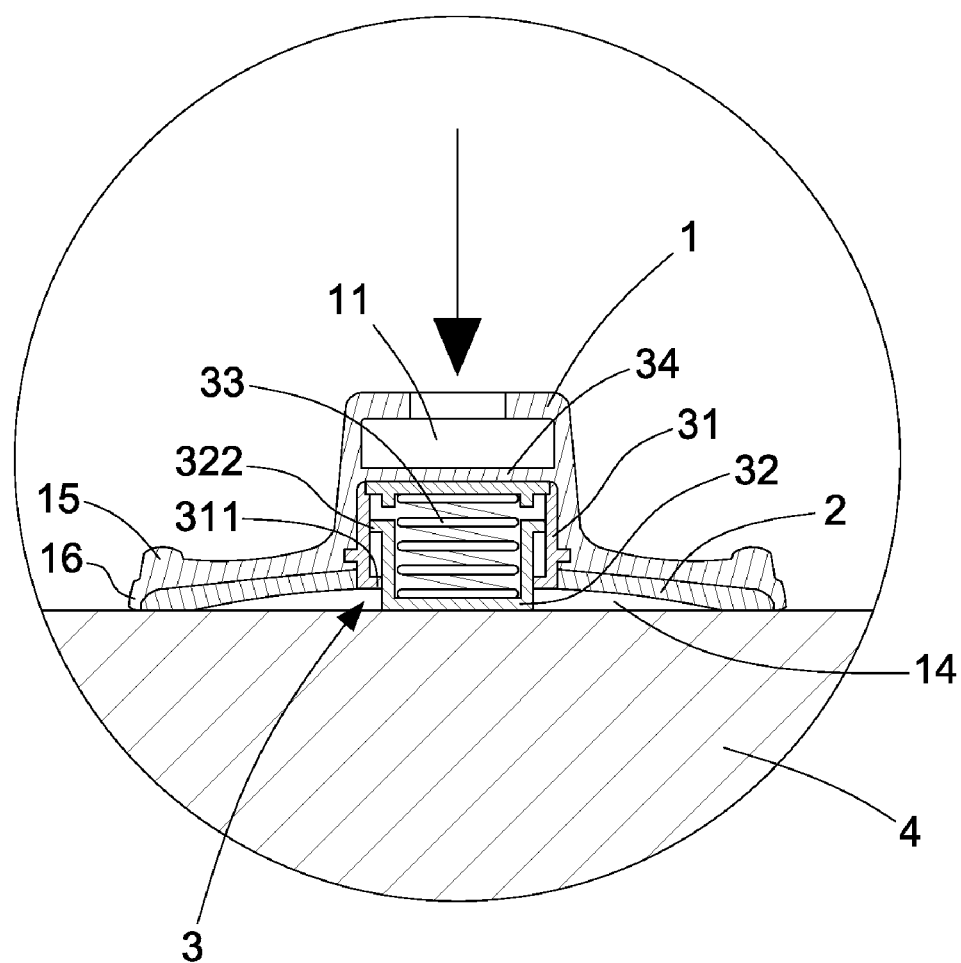
FIG. 4 is a schematic view of the present invention applied to a smooth airtight surface in a pressed state.
Figure 5:
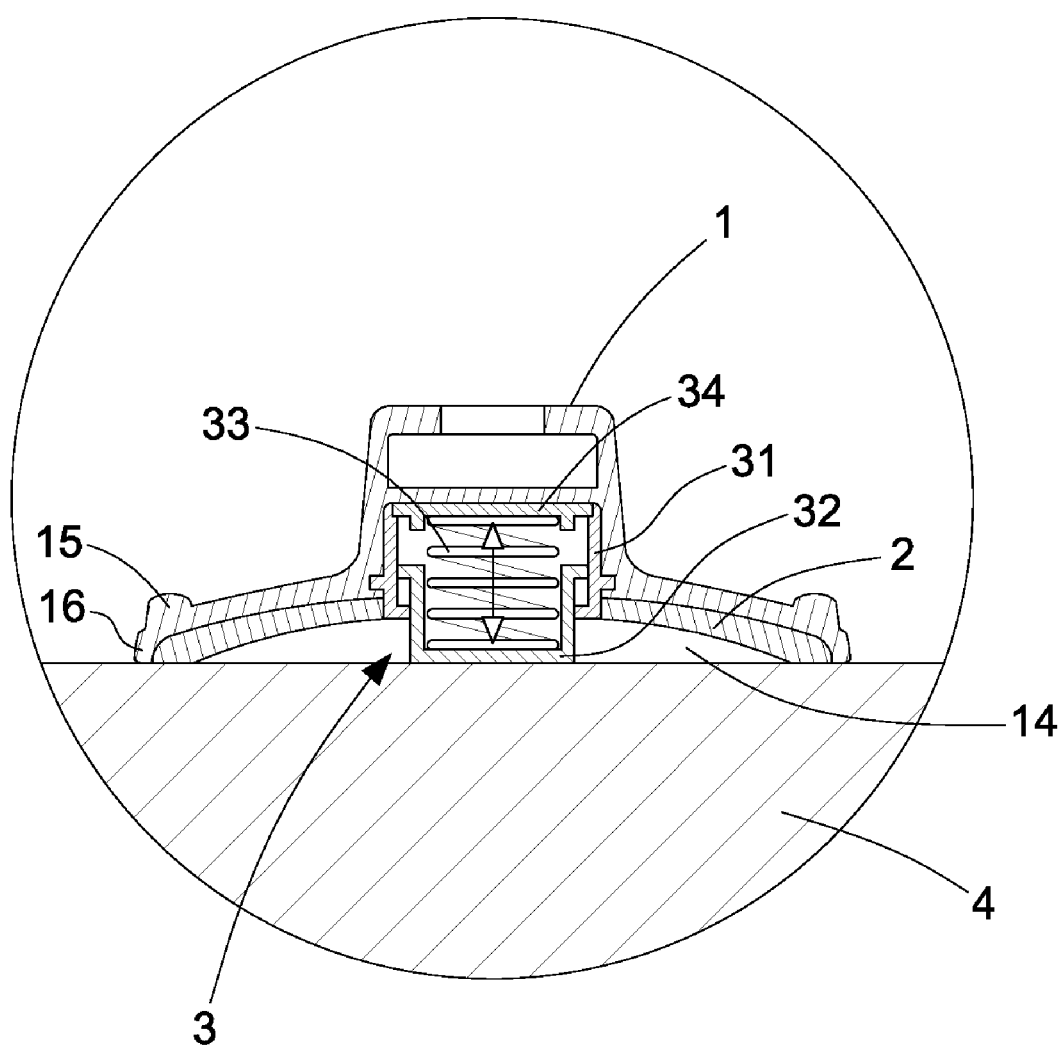
FIG. 5 is a schematic view of the present invention attached to a smooth airtight surface.

FIG. 4 shows the present invention is applied to a smooth airtight surface 4. The adhesive soft inner body 2 is adhered to the smooth airtight surface 4. The top end of the outer body 1 is pressed by the user's hand to expel the air in the second chamber 14 to form a vacuum state. The slide seat 32 in the outlet 312 of the base 31 will be retracted toward the top lid 34 to compress the elastic member 33. When the user releases his/her hand, the slide seat 32 biased by the elastic member 33 will be moved toward the smooth airtight surface 4, as shown in FIG. 5. The outer body 1 and the adhesive soft inner body apply a force in an opposite direction to enhance vacuum and adhesion effect.

Figure 6:
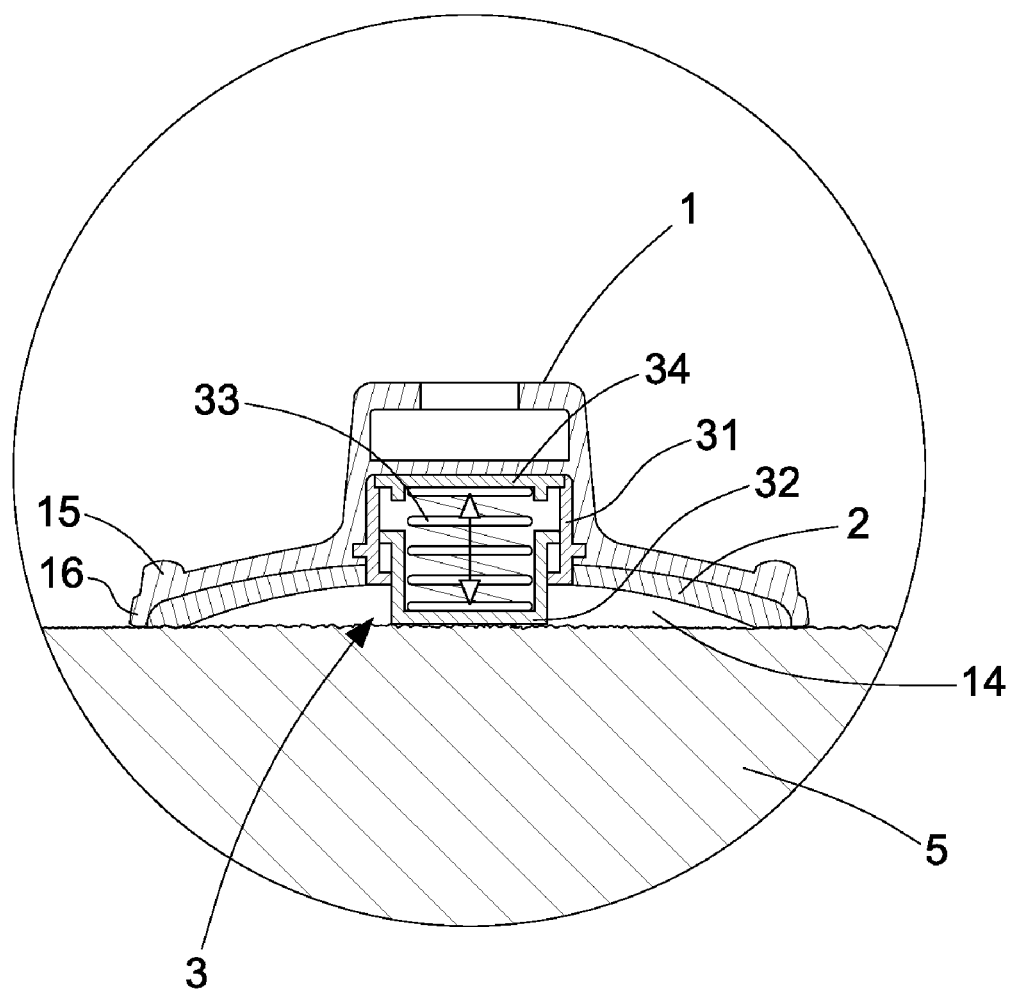
FIG. 6 is a schematic view of the present invention attached to a rough airtight surface.
Figure 7:
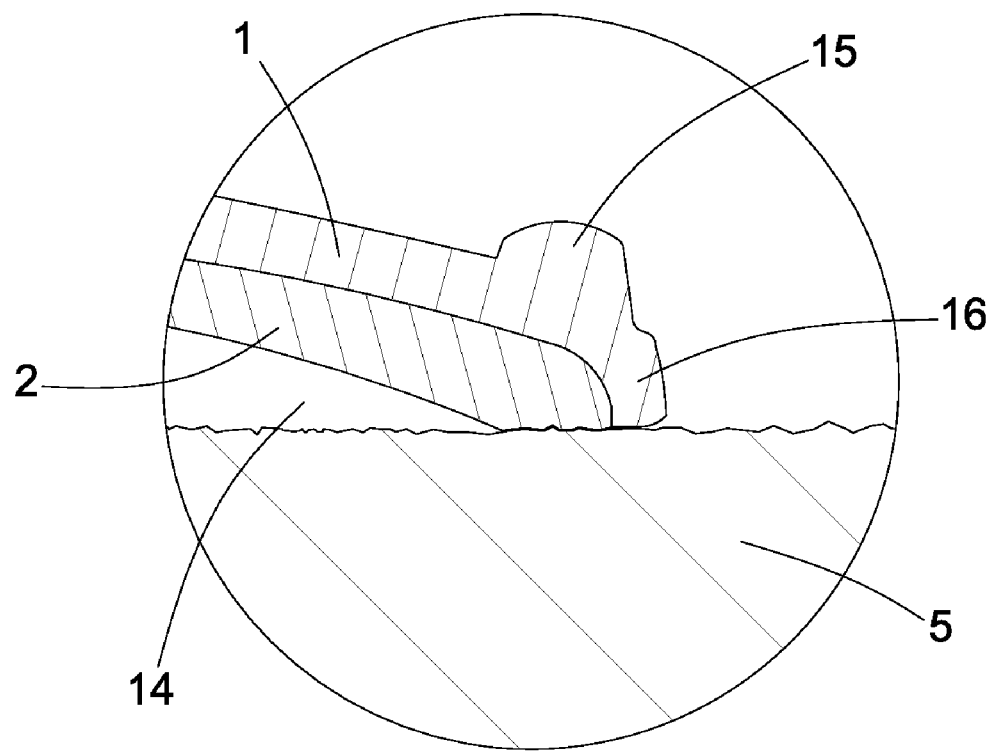
FIG. 7 is a schematic view of the present invention applied to a rough airtight surface with the adhesive soft inner body to seal the rough airtight surface.

When the present invention is applied to a rough airtight surface 5, the adhesive soft inner body 2 is adhered to the rough airtight surface 5 and the top end of the outer body 1 is pressed by the user's hand, the adhesive soft inner body 2 in contact with the rough airtight surface 5 will be deformed to seal the rough surface 5 firm. As shown in FIG. 6 and FIG. 7, the air in the second chamber 14 is expelled to form a vacuum state. The slide seat 32 in the outlet 312 of the base 31 will be retracted toward the top lid 34 to compress the elastic member 33. When the user releases his/her hand, the slide seat 32 biased by the elastic member 33 will be moved toward the rough airtight surface 5. The outer body 1 and the adhesive soft inner body 2 apply a force in an opposite direction to enhance vacuum and adhesion effect.

The dual-layer suction cup of the present invention uses the adhesive soft inner body to attach to a rough airtight surface and the elastic ember to enhance the adhesion effect.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A dual-layer suction cup, comprising:
    an outer body, the outer body having a first chamber therein and a second chamber under the first chamber, the second chamber being larger than the first chamber;
    an adhesive soft inner body adhered to the second chamber of the outer body, the adhesive soft inner body having an opening at a central portion thereof; and
    an elastic unit disposed in the first chamber, the elastic unit comprising a base connected to the outer body, the base having a central outlet at a lower end thereof; a slide seat disposed in the base, the slide seat being movable inward or outward within the base, and an elastic member received in the slide seat,
    wherein the outer body has a dish-like shape and a protruding central portion, the outer body includes a connection mouth on a top end thereof and a partition under the connection mouth, and the first chamber is disposed under the partition inside the outer body.

2. The dual-layer suction cup as claimed in claim 1, wherein the outer body has an annular flange.

3. The dual-layer suction cup as claimed in claim 1, wherein the outer body has an annular rib on top of an outer edge of the outer body.

4. The dual-layer suction cup as claimed in claim 1, wherein the outer body has an annular groove on a side of the first chamber, the elastic unit has an engaging ring on an outer wall of the base, and the engaging ring is located in the annular groove of the outer body.

5. The dual-layer suction cup as claimed in claim 1, wherein the elastic unit comprises the base, the slide seat, elastic member, and a top lid; the base being hollow inside, the base having the central outlet at the lower end thereof; the slide seat being accommodated in the base and is movable inward or outward, the slide seat having an open upper end, an accommodation room, a closed lower end, a closed side wall and an extension flange on the upper end of the slide seat, the extension flange being blocked by a stop ring of the base; the elastic member being received in the accommodation room of the slide seat, the elastic member being a spring, the top lid being disposed on top of the base, the top lid having a positioning ring at a bottom of the top lid and a space formed in the positioning ring to accommodate an upper end of the elastic member.

6. The dual-layer suction cup as claimed in claim 1, wherein the outer body is made of a hard material which has a hardness ranged from 65 to 75 degrees Shore and is made of either Thermoplastic Elastomer (TPE) or Thermoplastic Rubber (TPR).

7. The dual-layer suction cup as claimed in claim 1, wherein the adhesive soft inner body is made of a soft material which has a hardness ranged from 0 to 10 degrees Shore and is made of either Thermoplastic Elastomer (TPE) or Thermoplastic Rubber (TPR).

8. A dual-layer suction cup, comprising:
an outer body, the outer body having a first chamber therein and a second chamber under the first chamber, the second chamber being larger than the first chamber;
an adhesive soft inner body adhered to the second chamber of the outer body, the adhesive soft inner body having an opening at a central portion thereof; and
an elastic unit disposed in the first chamber, the elastic unit comprising a base connected to the outer body, the base having a central outlet at a lower end thereof; a slide seat disposed in the base, the slide seat being movable inward or outward within the base, and an elastic member received in the slide seat,
wherein the outer body has an annular groove on a side of the first chamber, the elastic unit has an engaging ring on an outer wall of the base, and the engaging ring is located in the annular groove of the outer body.

9. A dual-layer suction cup, comprising:
an outer body, the outer body having a first chamber therein and a second chamber under the first chamber, the second chamber being larger than the first chamber;
an adhesive soft inner body adhered to the second chamber of the outer body, the adhesive soft inner body having an opening at a central portion thereof; and
an elastic unit disposed in the first chamber, the elastic unit comprising a base connected to the outer body, the base having a central outlet at a lower end thereof; a slide seat disposed in the base, the slide seat being movable inward or outward within the base, and an elastic member received in the slide seat,
wherein the elastic unit comprises the base, the slide seat, the elastic member, and a top lid; the base being hollow inside, the base having the central outlet at the lower end thereof; the slide seat being accommodated in the base and is movable inward or outward, the slide seat having an open upper end, an accommodation room, a closed lower end, a closed side wall and an extension flange on the upper end of the slide seat, the extension flange being blocked by a stop ring of the base; the elastic member being received in the accommodation room of the slide seat, the elastic member being a spring, the top lid being disposed on top of the base, the top lid having a positioning ring at a bottom of the top lid and a space formed in the positioning ring to accommodate an upper end of the elastic member.

* * * * *